No. 859,777. PATENTED JULY 9, 1907.
R. T. MARKEE.
DOUGH SHEETING MACHINE.
APPLICATION FILED MAR. 5, 1906.

2 SHEETS—SHEET 1.

Witnesses: Inventor:

No. 859,777. PATENTED JULY 9, 1907.
R. T. MARKEE.
DOUGH SHEETING MACHINE.
APPLICATION FILED MAR. 5, 1906.
2 SHEETS—SHEET 2.
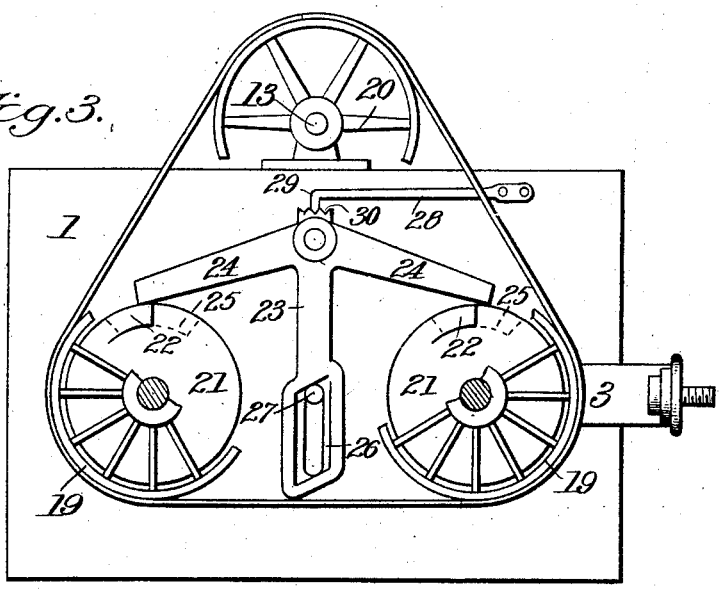
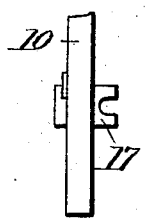
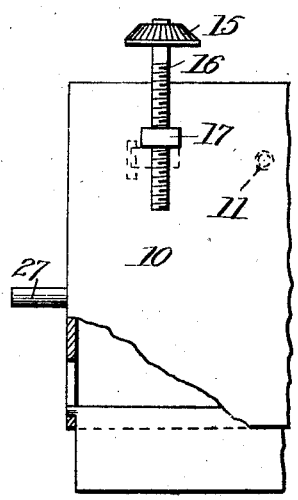
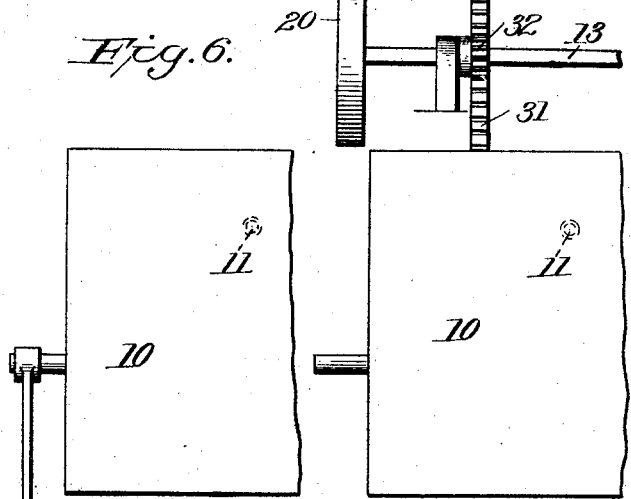

UNITED STATES PATENT OFFICE.

REUEL T. MARKEE, OF PHILADELPHIA, PENNSYLVANIA.

DOUGH-SHEETING MACHINE.

No. 859,777. Specification of Letters Patent. Patented July 9, 1907.

Application filed March 5, 1906. Serial No. 304,420.

*To all whom it may concern:*

Be it known that I, REUEL T. MARKEE, a citizen of the United States, residing at Philadelphia, in the county of Philadelphia and State of Pennsylvania, have invented certain new and useful Improvements in Dough-Sheeting Machines, of which the following is a specification.

This invention relates to improvements in dough-sheeting machines, and the object is to provide an improved machine, in which the feeding of the dough is automatically regulated, and having means for automatically removing all residual dough.

A further object of my invention is to so construct the plunger which operates on the dough that it may be readily removed and a plunger of different design substituted, according to the material to be worked.

A still further object is to provide means for heating and cooling the center of the machine, which is desirable when working certain material.

Figure 1:
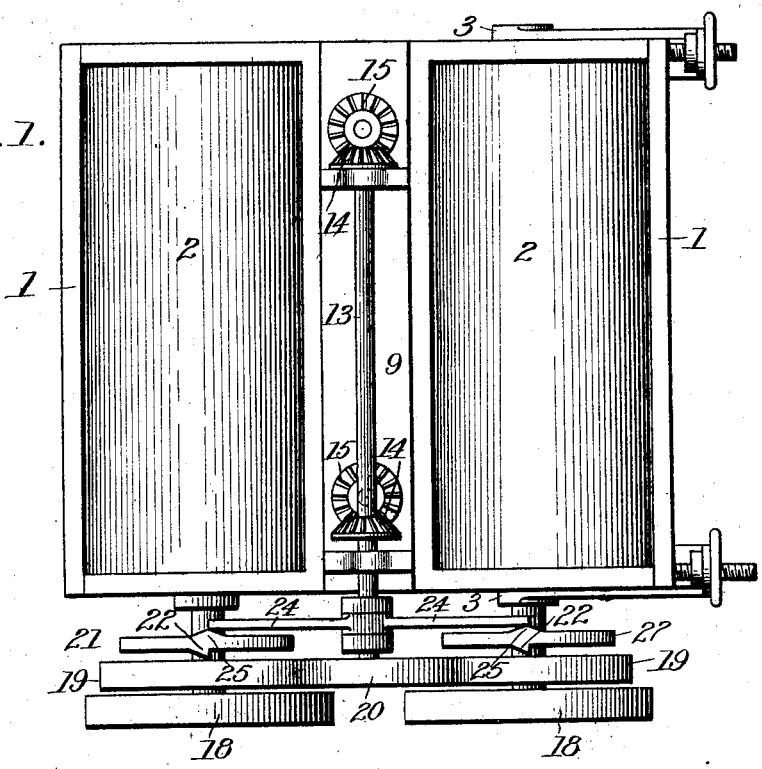
Figure 2:
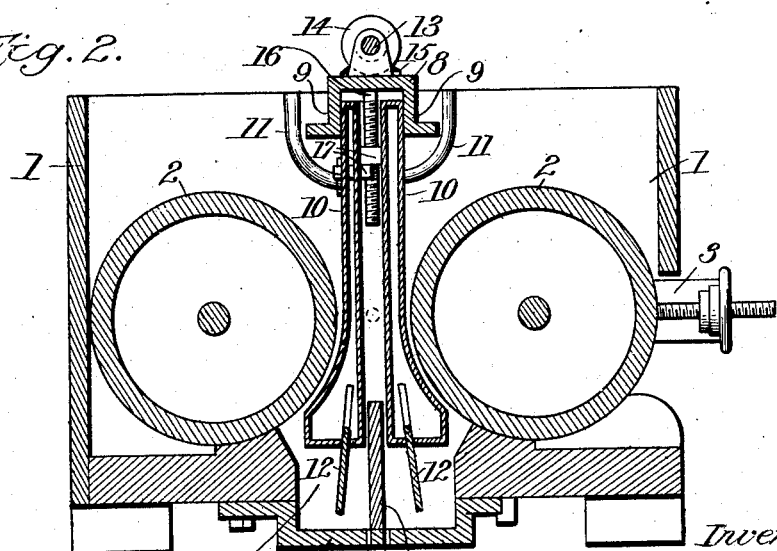

With the above object in view, the invention consists in the novel features of construction hereinafter fully described, particularly pointed out in the claims, and clearly illustrated by the accompanying drawing, in which, Figure 1 is a top plan view of a machine constructed in accordance with my invention; Fig. 2, a vertical sectional view taken transversely through the feeding rolls; Fig. 3, a detail view showing the shifting mechanism; Fig. 4, a detail view of the means for operatively connecting the plungers to the screw shafts; Fig. 5, a view of the rear face of a portion of one of the plungers, shown partly in section; Fig. 6, a view showing a modified construction for operating the plungers, and Fig. 7, a view illustrating another modification of operating means for the plungers.

Referring now more particularly to the drawings, 1 designates a hopper, through which the dough is fed, said hopper being divided into two compartments, by the plungers hereinafter to be described. Mounted to rotate in each compartment is a feeding roll 2. One of the feed-rolls is mounted in adjustable bearings 3, whereby it may be adjusted to or from the other roll.

The hopper is provided centrally with an opening 4, which opening is disposed between the two feeding rolls as illustrated in Fig. 2. Secured to the under side of the hopper and covering said opening is a plate 5 formed with openings 6 of any desired contour, through which the dough is forced in sheets. The bottom wall of the hopper is enlarged at the opening 4, the edges of the side walls at said opening being inclined as illustrated. Thus a chamber is formed at this point, which chamber is divided into two compartments by the transversely-extending plate 7 which is either permanently or removably secured in position in the hopper. The openings 6 in the plate 5 are so disposed as to provide an outlet for each of the smaller chambers formed by the division plate 7.

Extending across the top of the hopper at a central point is a cross piece 8 having depending side-flanges 9. These side-flanges 9 confine the upper ends of the vertically-movable plungers 10. Said plungers 10 are made hollow as clearly illustrated in Fig. 2 and have their rear faces straight, and the lower portions of the outer faces curved, to correspond with the contour of the feeding rolls. Each plunger is formed with an inlet to which a pipe 11 is connected to convey steam or a cooling medium to their interiors for the purpose of heating or cooling the same when desired, according to the material being worked. Each plunger is provided with a plate 12 which projects from the bottom thereof into the dough chambers hereinbefore referred to, said plates being so mounted as to move into and out of the plungers, so that when the plungers descend, said plates move upward therein, and as the plungers ascend, drop to their normal position by gravity. These plates 12 in their normal positions divide the two small dough chambers each into two parts having communication with each other beneath the lower edges of the plates.

Mounted on top of the cross-piece 8 is a shaft 13 carrying at each end a beveled gear 14. These beveled gears 14 mesh with beveled gears 15 carried by the upper end of screw-shafts 16. These screw-shafts 16 are mounted at their upper ends in cross-piece 8, and engage half-nuts 17 carried by the plungers. Either or both of the plungers can be operatively connected with these shafts by means of locking device shown in Fig. 4.

The shaft of each of the feed rolls projects beyond the wall of the hopper and carries a pulley 18. These pulleys are driven by a suitable belt from the source of power, the feed-rolls revolving toward each other. On the shaft of each roll is a loose pulley 19 and fixed upon the end of the shaft 13 is a pulley 20. A belt passes around the pulley 19 and pulley 20 as clearly indicated in Fig. 3. Mounted to slide on each roll-shaft is a disk 21 having upon its face a projection 22 to engage in a corresponding projection formed in each pulley 19. For automatically moving said locking disks into engagement with the pulleys 19 and thereby alternately locking the latter to the shafts of the rolls for the purpose of effecting the rotation of shaft 13 in reverse directions, I provide a shifting device consisting of a substantially T-shaped lever 23, pivotally mounted at its upper end upon the exterior of the hopper and having projecting from said upper end lateral arms 24. Said shifting lever is automatically swung on its pivot to alternately bring said arms 24 in position to engage cam-projections 25 formed on the inner face of the locking disk 21. By moving these arms 24 in the path of the cam-projections 25, said locking-disks will be moved laterally on the roll-shafts until their projections 22 are forced into engagement with the notches in the pulleys 19. For effecting this movement of the shifting-lever 23 to swing its arms 24 alternately into position to effect the locking of pulleys 19 to the roll shafts, I form the stem portion of said lever with a cam-slot 26 in which one of the guide pins 27 of one of the plungers 10 is adapted to move as said plunger ascends and descends. For holding the shifting lever in its several positions, I provide a spring arm 28 having a hooked end 29 which engages in notches 30 formed in the upper end of said lever. The operation of this portion of my invention is as follows: One of the arms of the shifting lever is moved into the path of the cam-projection on the proper locking disk for locking the proper pulley 19 to its shaft to effect the rotation of the shaft 13 in a direction to move the plungers downwardly in the hopper. The plungers moving downwardly, press out all the dough from the machine, thus completely cleaning the same. When they have reached their downward movement, the guide pin 27 by engagement with the cam-portion of the slot 26, effects the swinging of said lever to move the other arm 24 into position to be engaged by the cam projection on the other locking disk. Thus, the other pulley 19 is locked to the shaft of the feed-roll, while the first mentioned pulley is released therefrom. This effects the rotation of the shaft 13 in a reverse direction, and raises the plungers to their normal position.

In Fig. 6, I have illustrated a treadle 30′ for raising and lowering the plungers. This may be used in some machines without the automatic arrangement, and it forms a very desirable feature in combination with the plunger-operating mechanism, as it may be used to raise or lower said plungers when the machine is not in operation. In Fig. 7, I have provided the plungers with racks 31 to be engaged by pinions 32 carried by the horizontal shaft 13. This is in lieu of the screw-shafts and the beveled gears.

The feeding of the dough is automatically regulated by providing a little lost motion in the screw shafts, which will permit the plungers to automatically raise upon an undue pressure of the dough upon their under sides, thereby reducing the quantity of the dough fed between the rolls and the concave surfaces of the plungers or for cutting the same off entirely.

While I prefer to use one shaft to raise and lower the plungers, two shafts can be used if desired, one on each of the plungers.

From the above description, it will be seen that I have produced a machine in which different kinds of materials may be worked in respective sides of the hopper and in which said material may be heated or cooled as necessary, also in which the feeding of dough is automatically regulated, and the machine automatically cleaned by the plungers.

Having thus fully described my invention, what I claim as new, and desire to secure by Letters Patent of the United States, is:

1. In a dough sheeting machine, the combination with a hopper of a feed roll mounted to rotate in said hopper, and an automatically adjustable plunger positioned in said hopper and having a concave surface to coact with the feed roll.

2. In a dough sheeting machine, the combination with a hopper of a feed roll mounted to rotate in said hopper, a plunger positioned in said hopper having a concave surface adapted to coact with the feed roll, and a dough chamber formed beneath said plunger.

3. In a dough sheeting machine, the combination with a hopper of a feed roll mounted to rotate in said hopper, a plunger positioned in said hopper to coact with the feed roll, a dough chamber formed beneath said plunger having an outlet, and means for effecting the movement of said plunger to force the dough in said chamber out through the opening therein.

4. In a dough sheeting machine, the combination with a hopper, of a feed roll mounted to rotate therein, a plunger positioned in said hopper having an interior chamber, a dough chamber formed beneath said plunger having an outlet, means for conducting a heating or cooling medium to said interior chamber of the plunger, and means for effecting the movement of said plunger.

5. In a dough sheeting machine, a hopper, a feed roll mounted to rotate therein, a plunger positioned in said hopper having a surface coacting with the feed roll, a dough chamber formed beneath said feed roll having an outlet, a plate or blade projecting from the under side of said plunger into said dough chamber and arranged to move upward into the plunger when the latter descends, and means for effecting the movement of said plunger in the hopper.

6. In a dough sheeting machine, a hopper, a feed roll mounted to rotate therein, a plunger movably mounted in said hopper having a surface to coact with the feed roll, screw shafts, means for operatively connecting said plunger with said screw shafts, means for rotating said screw shafts, and a dough chamber formed beneath said plunger having an outlet.

7. In a dough sheeting machine, a hopper, feed rolls mounted to rotate therein, plungers movably positioned in said hopper and having surfaces coacting with said feed rolls, operating means for effecting the movement of said plungers vertically in the hopper, and means for operatively connecting either or both of said plungers to the operating means.

8. In a dough sheeting machine, a hopper, a feed roll mounted to rotate therein, a plunger movable vertically in said hopper and having a surface coacting with said feed roll, means for imparting vertical movement to said plunger, and automatic shifting means for reversing the movement of said plunger.

9. In a dough sheeting machine, a hopper, feed rolls mounted to rotate therein, plungers movable vertically in said hopper and having surfaces coacting with said feed rolls, pulleys loose on the shafts of said feed rolls, a shaft carrying a pulley, a belt passing around the pulley on said shaft and the pulleys on the shafts of the feed rolls, clutches positioned on the shafts of said feed rolls, and shifting means operated by the plungers for operating either of the clutches to lock either one of the loose pulleys to its shaft.

10. In a dough sheeting machine, a hopper, feed rolls mounted to rotate in said hopper, means for rotating said rolls in opposite directions, plungers movable vertically in said hopper having surfaces coacting with the rolls, an operating shaft for effecting the movement of said plungers, a pulley carried by said shaft, pulleys loose on the shafts of the feed rolls, a belt passing around said pulleys, sliding locking disks on the shafts of the feed rolls having locking portions to coact with the loose pulleys and provided with cam projections, a pivoted shifting lever having lateral arms adapted to be moved in the paths of said cam projections, and means actuated by the plungers to effect the shifting of said lever to bring its lateral arms alternately into position to alternately engage the cam projections on the respective locking disks.

In testimony whereof I have affixed my signature in presence of two witnesses.

REUEL T. MARKEE.

Witnesses:
ELMER J. MATHER,
CHAS. E. WILKINSON.